US012213921B2

(12) United States Patent
Davis

(10) Patent No.: US 12,213,921 B2
(45) **Date of Patent: *Feb. 4, 2025**

(54) INFLATABLE MATTRESS WITH LONGITUDINALLY ORIENTED STRINGERS

(71) Applicant: D.T. Davis Enterprises, Ltd., Allentown, PA (US)

(72) Inventor: David T. Davis, Bethlehem, PA (US)

(73) Assignee: D.T. Davis Enterprises, Ltd., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,618

(22) Filed: Nov. 22, 2023

(65) Prior Publication Data

US 2024/0082077 A1 Mar. 14, 2024

Related U.S. Application Data

(63) Continuation of application No. 17/685,911, filed on Mar. 3, 2022, now Pat. No. 11,826,285, which is a (Continued)

(51) Int. Cl.
*A61G 1/013* (2006.01)
*A47C 27/08* (2006.01)
(Continued)

(52) U.S. Cl.
CPC ............ *A61G 1/013* (2013.01); *A47C 27/081* (2013.01); *A47C 27/087* (2013.01); *A61G 1/048* (2013.01); *A61G 7/1028* (2013.01)

(58) Field of Classification Search
CPC ........ A61G 1/013; A61G 1/048; A61G 7/001; A61G 7/05769; A61G 7/05792;
(Continued)

(56) References Cited

U.S. PATENT DOCUMENTS 2,612,645 A 9/1949 Boland
5,067,189 A 11/1991 Weedling et al.
(Continued)

FOREIGN PATENT DOCUMENTS

WO WO-0009064 A1 * 2/2000 ........... A61B 6/0485
WO 2019079552 A1 4/2019

OTHER PUBLICATIONS

International Search Report and Written Opinion of corresponding International Application PCT/US2018/056446 dated Dec. 21, 2018.

*Primary Examiner* — Robert G Santos
(74) *Attorney, Agent, or Firm* — Duane Morris LLP

(57) ABSTRACT

A transfer mattress includes a top panel; a bottom panel; an outer stringer having a superior edge coupled to the top panel and an inferior edge coupled to the bottom panel such that a portion of the outer stringer extending between the top panel and the bottom panel is at an angle other than 90 degrees with respect to the top panel and the bottom panel when the mattress body is inflated; and an inner stringer positioned between the central longitudinal axis and the outer stringer and having a superior edge coupled to the top panel and an inferior edge coupled to the bottom panel such that a portion of the inner stringer extending between the top panel and the bottom panel is at an angle other than 90 degrees with respect to the top panel and the bottom panel when the mattress body is inflated.

20 Claims, 10 Drawing Sheets

Related U.S. Application Data continuation of application No. 16/756,197, filed as application No. PCT/US2018/056446 on Oct. 18, 2018, now Pat. No. 11,266,551.

(60) Provisional application No. 62/663,618, filed on Apr. 27, 2018, provisional application No. 62/574,870, filed on Oct. 20, 2017.

(51) Int. Cl.

| | |
|---|---|
| ***A61G 1/048*** | (2006.01) |
| ***A61G 7/10*** | (2006.01) |

(58) Field of Classification Search

CPC .. A61G 7/1021; A61G 7/1028; A47C 27/081; A47C 27/087

USPC ........ 5/627, 625, 81.1 HS, 81.1 R, 711, 715, 5/706

See application file for complete search history.

(56) References Cited

U.S. PATENT DOCUMENTS

| | | | | |
|---|---|---|---|---|
| 5,092,007 | A | 3/1992 | Hasty | |
| RE35,299 | E | 7/1996 | Weedling et al. | |
| 5,560,057 | A | 10/1996 | Madsen et al. | |
| 5,561,873 | A | 10/1996 | Weedling et al. | |
| 6,073,291 | A | 6/2000 | Davis | |
| 7,340,785 | B2 | 3/2008 | Weedling et al. | |
| 7,627,910 | B2 | 12/2009 | Davis | |
| 8,566,977 | B2 | 10/2013 | Davis | |
| 8,656,540 | B2 | 2/2014 | Chen | |
| 8,661,590 | B2 | 3/2014 | Chen | |
| 9,504,621 | B2 | 11/2016 | Purdy et al. | |
| 11,266,551 | B2 | 3/2022 | Davis | |
| 11,826,285 | B2 * | 11/2023 | Davis | A47C 27/087 |
| 2006/0000016 | A1 | 1/2006 | Weedling et al. | |
| 2008/0289102 | A1 | 11/2008 | Davis | |
| 2012/0215011 | A1 | 8/2012 | Davis | |
| 2012/0311781 | A1 | 12/2012 | Purdy et al. | |
| 2013/0145560 | A1 | 6/2013 | Chen | |
| 2013/0180052 | A1 | 7/2013 | Chen | |
| 2021/0186780 | A1 | 6/2021 | Davis | |
| 2022/0183906 | A1 | 6/2022 | Davis | |
| 2024/0082077 | A1 * | 3/2024 | Davis | A61G 7/001 |

* cited by examiner

INFLATABLE MATTRESS WITH LONGITUDINALLY ORIENTED STRINGERS

CROSS-REFERENCE TO RELATED APPLICATIONS

This application is a continuation of U.S. patent application Ser. No. 17/685,911, filed Mar. 3, 2022, now U.S. Pat. No. 11,826,285; and U.S. patent application Ser. No. 16/756,197, filed on Apr. 15, 2020, now U.S. Pat. No. 11,266,551, which is a national stage entry of International Patent Appl. Serial No. PCT/US2018/056446, filed on Oct. 18, 2018, which claimed priority under 35 U.S.C. § 119 (e) to U.S. Provisional Application Ser. No. 62/663,618, filed on Apr. 27, 2018, and U.S. Provisional Application Ser. No. 62/574,870, filed on Oct. 20, 2017, the entireties of each of which are incorporated herein by reference for all purposes as if fully set forth herein.

BACKGROUND

Patient handling mattresses are known in the art which include at least two flexible material sheets, that together define a plenum chamber, with at least one sheet being perforated with small pinholes over at least a central surface area, and which open up directly to the interior of the plenum chamber. Such prior art mattresses are used by arranging the perforated sheet so that it faces an underlying fixed, generally planar support surface, such as a floor or table. When the mattress is charged with pressurized air, the increased volume of air acts initially to jack a load placed upon the mattress above the perforated flexible sheet, and the escape of air under pressure through the pinholes creates an air bearing of relatively small height between the underlying fixed, generally planar support surface and the perforated flexible sheet.

SUMMARY

According to an embodiment of the present disclosure, a transfer mattress includes a top panel having a perimeter including a proximal edge and a distal edge, wherein a central longitudinal axis extends from the proximal edge to the distal edge; a bottom panel having a plurality of perforations and a perimeter including a proximal edge and a distal edge, the perimeter of the bottom panel coupled to the perimeter of the top panel to define a mattress body; an outer stringer having a superior edge coupled to the top panel and an inferior edge coupled to the bottom panel such that a portion of the outer stringer extending between the top panel and the bottom panel is at an angle other than 90 degrees with respect to the top panel and the bottom panel when the mattress body is inflated; and an inner stringer positioned between the central longitudinal axis and the outer stringer and having a superior edge coupled to the top panel and an inferior edge coupled to the bottom panel such that a portion of the inner stringer extending between the top panel and the bottom panel is at an angle other than 90 degrees with respect to the top panel and the bottom panel when the mattress body is inflated.

In an aspect, the portion of the outer stringer extending between the top panel and the bottom panel and the portion of the inner stringer extending between the top panel and the bottom panel are angled from the top panel in a direction away from the central longitudinal axis.

In an aspect, the transfer further includes a second inner stringer and a second outer stringer, the second inner stringer and the second outer stringer located on an opposite side of the central longitudinal axis from the inner stringer and the outer stringer.

In an aspect, when the transfer mattress is inflated, a distance between the inner stringer and the second inner stringer is between approximately 25% and approximately 35% of a width of the transfer mattress.

In an aspect, the inner stringer and the second inner stringer are symmetrically located about the central longitudinal axis.

In an aspect, the outer stringer is longer than the inner stringer.

In an aspect, at least a portion of the superior edge of the inner stringer is not parallel with the central longitudinal axis of the transfer mattress.

In an aspect, at least a portion of the inferior edge of the inner stringer is parallel with the central longitudinal axis of the transfer mattress.

In an aspect, the outer stringer and the inner stringer fold toward the central longitudinal axis when the mattress body is deflated.

In an aspect, the transfer mattress further includes a first connector coupled to the mattress body; and a second connector spaced from the first connector and coupled to the mattress body; wherein a longitudinal distance between the first connector and the second connector is the same when the transfer mattress is inflated as when the transfer mattress is deflated, and wherein the first connector and the second connector are configured to couple an accessory to the transfer mattress.

In an aspect, the first connector and the second connector are snaps.

In an aspect, the transfer mattress further includes a length of hook and loop fastener coupled to the top panel and extending along and adjacent to the superior edge of either the outer stringer or the inner stringer.

According to another embodiment of the present disclosure, a method of rolling a patient includes providing a transfer mattress comprising: a top panel having a perimeter including a proximal edge and a distal edge, wherein a central longitudinal axis extends from the proximal edge to the distal edge; a bottom panel having a plurality of perforations and a perimeter including a proximal edge and a distal edge, the perimeter of the bottom panel coupled to the perimeter of the top panel; and an inner stringer and an outer stringer on each side of the central longitudinal axis, wherein a portion of each of the inner stringer and the outer stringer are substantially parallel to the central longitudinal axis, wherein a portion of the outer stringer extending between the top panel and the bottom panel is at an angle other than 90 degrees with respect to the top panel and the bottom panel when the transfer mattress is inflated, and a portion of the inner stringer extending between the top panel and the bottom panel is at an angle other than 90 degrees with respect to the top panel and the bottom panel when the transfer mattress is inflated; positioning a patient on the top panel of the transfer mattress; inflating the transfer mattress; applying a downward force on the top panel on a first side of the patient; and applying a lifting force to the transfer mattress on an opposite side of the patient.

In an aspect, the downward force is applied between the outer stringer and a perimeter edge of the transfer mattress.

In an aspect, when the transfer mattress is inflated a distance between the inner stringer and the second inner stringer is between approximately 25% and approximately 35% of a width of the transfer mattress.

In an aspect, at least a portion of the outer stringer is taller than the inner stringer.

According to another embodiment of the present disclosure, a mattress system includes a transfer mattress comprising: a top panel having a perimeter including a proximal edge and a distal edge, wherein a central longitudinal axis extends from the proximal edge to the distal edge; a bottom panel having a plurality of perforations and a perimeter including a proximal edge and a distal edge, the perimeter of the bottom panel coupled to the perimeter of the top panel to form a mattress body; an outer stringer having a superior edge coupled to the top panel and an inferior edge coupled to the bottom pane such that a portion of the outer stringer extending between the top panel and the bottom panel is at an angle other than 90 degrees with respect to the top panel and the bottom panel when the mattress body is inflated; an inner stringer positioned between the central longitudinal axis and the outer stringer and having a superior edge coupled to the top panel and an inferior edge coupled to the bottom panel such that a portion of the inner stringer extending between the top panel and the bottom panel is at an angle other than 90 degrees with respect to the top panel and the bottom panel when the mattress body is inflated; a first connector coupled to the mattress body; a second connector spaced from the first connector and coupled to the mattress body, wherein a longitudinal distance between the first connector and the second connector is the same when the transfer mattress is inflated as when the transfer mattress is deflated; and an accessory releasably coupled to the first connector and the second connector.

In an aspect, the mattress body further includes a perimeter band and the perimeter of the bottom panel is coupled to the perimeter of the top panel via the perimeter band.

In an aspect, the accessory is selected from the group consisting of a patient turning chamber, a microclimate measurement layer, an interface pressure measurement layer, an infection control identification layer, a disposable absorbent cover, a therapeutic pad, a flexible body litter with carry handles, a non-absorbent sanitary cover, a washable absorbent cover, a disposable cover, at least one cushion, an inflatable mattress with a pressure control valve, and an inflatable mattress with pulsating pressure control.

In an aspect, a first longitudinal distance is defined between the first connector and the proximal edge of the top panel and a second longitudinal distance is defined between the first connector and the distal edge of the top panel, the first longitudinal distance after inflation of the transfer mattress is the same as the first longitudinal distance before inflation of the transfer mattress, and the second longitudinal distance after inflation of the transfer mattress is the same as the second longitudinal distance before inflation of the transfer mattress.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
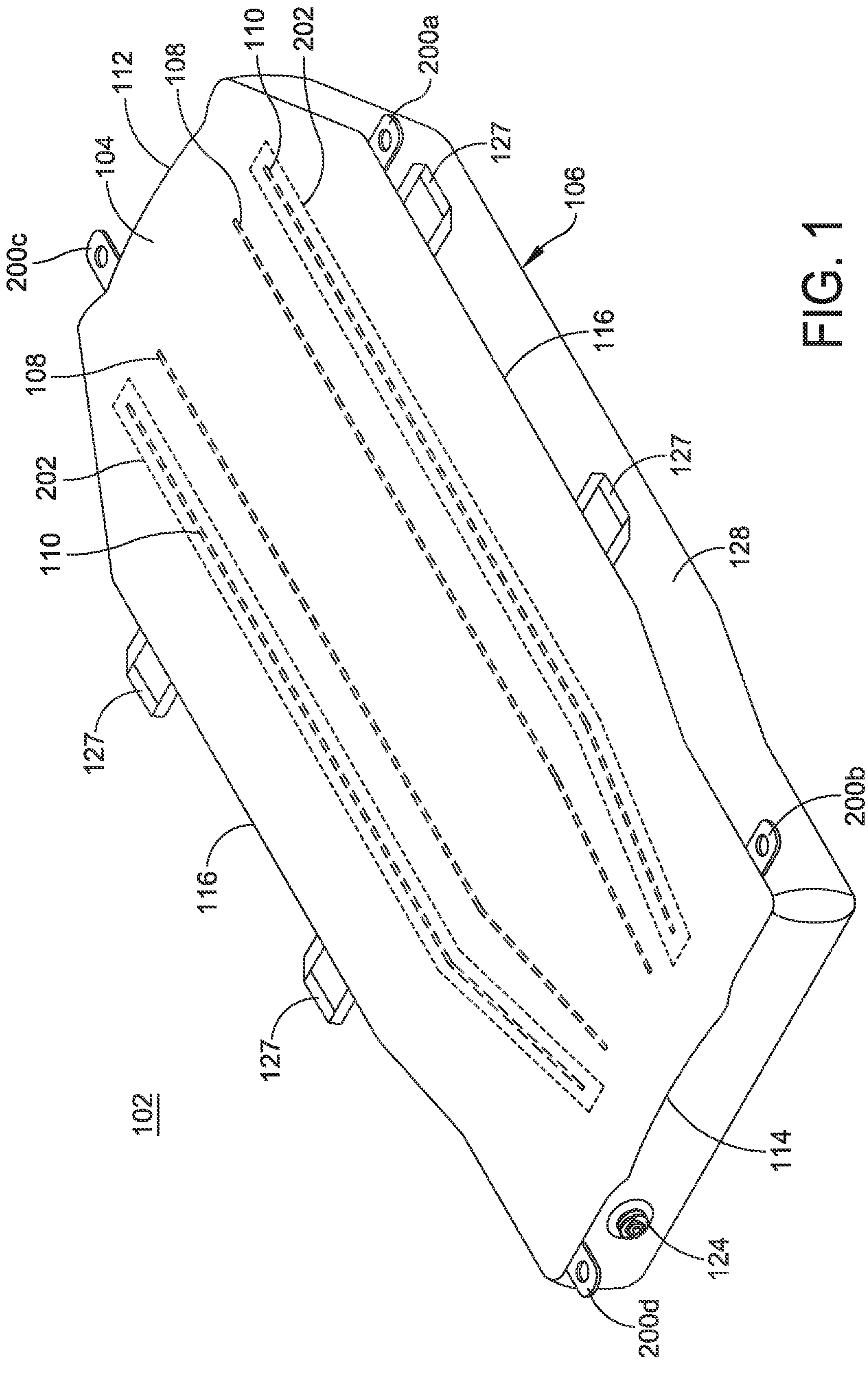
FIG. 1 is a top perspective view of an inflatable mattress having longitudinally oriented stringers, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship. In the claims, means-plus-function clauses, if used, are intended to cover structures described, suggested, or rendered obvious by the written description or drawings for performing the recited function, including not only structural equivalents but also equivalent structures.

As used herein, the term "substantially" denotes elements having a recited relationship (e.g., parallel, perpendicular, aligned, etc.) within acceptable manufacturing tolerances. For example, as used herein, the term "substantially parallel" is used to denote elements that are parallel or that vary from a parallel arrangement within an acceptable margin of error, such as +/−5°, although it will be recognized that greater and/or lesser deviations can exist based on manufacturing processes and/or other manufacturing requirements.

In various embodiments, a transfer mattress including inner and outer stringers is disclosed. The transfer mattress includes a top panel and a bottom panel coupled together at the edges. The top panel and the bottom panel define a mattress perimeter having a proximal (or head) end and a distal (or foot) end. A plurality of stringers are coupled between the top panel and the bottom panel. The plurality of stringers include inner stringers and outer stringers, wherein, in at least one embodiment, the inner stringers and outer stringers are of a different geometry. The stringers are arranged in a substantially longitudinal orientation. By so doing, fewer stringers may be needed when compared to mattresses having the stringers arranged in a substantially transverse orientation. This results in reductions in required materials as well as processing steps. Because of the reduction in stringers and material used, the transfer mattress may have better breathability, or moisture vapor transmission rate, than traditional inflatable mattresses. In addition, this arrangement of stringers provides substantial advantages when connecting an accessory to the inflatable mattress, as will be discussed further herein.

Figure 2:
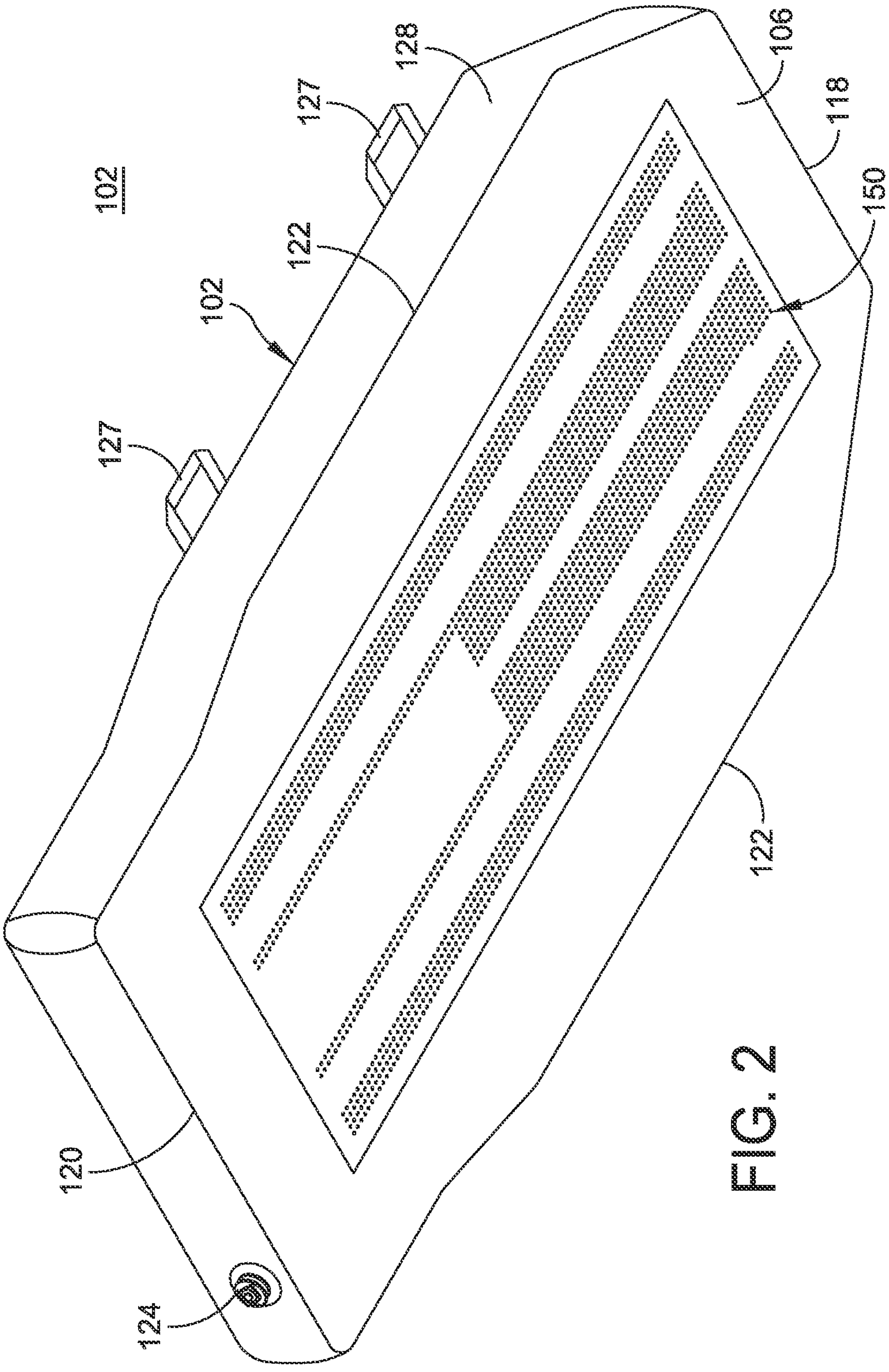
FIG. 2 is a bottom perspective view of the inflatable mattress of FIG. 1.

Referring to FIGS. 1 and 2, a transfer mattress 102 formed in accordance with the present embodiments comprises a top panel 104, a bottom panel 106, a plurality of inner stringers 108, and a plurality of outer stringers 110. More particularly, as shown in the top perspective view of FIG. 1, top panel 104 comprises a proximal edge 112, a distal edge 114, and peripheral edges 116 forming a perimeter of the top panel 104. A central longitudinal axis "A" (shown in FIG. 5) extends between the proximal edge 112 and the distal edge 114. As shown in the bottom perspective view of FIG. 2, bottom panel 106 comprises a proximal edge 118, a distal edge 120, and peripheral edges 122 forming a perimeter of the bottom panel 106. The top panel 104 and the bottom panel 106 can be formed from a sheet of nylon scrim or the like. An inlet opening 124 is coupled to the body of the transfer mattress 102, and may be a closable opening that sealingly accepts an air supply hose (not shown). The inlet opening 124 can be positioned at any location on transfer mattress 102. Inlet opening 124 is sized and shaped so that the air supply hose may be inserted, with the inlet being thereafter snapped shut or otherwise closed to hold the air supply hose in place while transfer mattress 102 is being inflated. Inlet opening 124 may also include a valve (not shown) that is biased to be normally closed to prevent air from exiting through the inlet, and opened when an air supply hose is inserted into inlet opening 124. Other arrangements known to those skilled in the art may be used to inflate transfer mattress 102. The transfer mattress 102 can also include a plurality of handles 127 to allow for easy handling and movement of the inflatable mattress.

The top panel 104 and the bottom panel 106 are engaged along the proximal edges 112, 118, the distal edges 114, 120, and the peripheral edges 116, 122. Although the illustrated embodiment includes a top panel 104 and a bottom panel 106 defining identical perimeters, it will be appreciated that the top panel 104 and/or the bottom panel 106 can define different perimeters. The top panel 104 and bottom panel 106 can be directly engaged, for example by radiofrequency welding, adhesives, weldable hook fasteners, sewing, heat sealing, ultrasonic welding, or the like. Alternatively, in some embodiments, as illustrated, a perimeter band 128 is coupled between the top panel 104 and the bottom panel 106.

Bottom panel 106 also includes a plurality of perforations 150 that are defined through its thickness to allow air, that is supplied by a low-pressure air supply to transfer mattress 102, via an air supply hose, to escape in a controlled manner. The air supplied to transfer mattress 102 escapes through the plurality of perforations 150, providing a weight-bearing cushion of air that facilitates the sliding of transfer mattress 102 along a surface, as well as from one surface to another.

Figure 3:
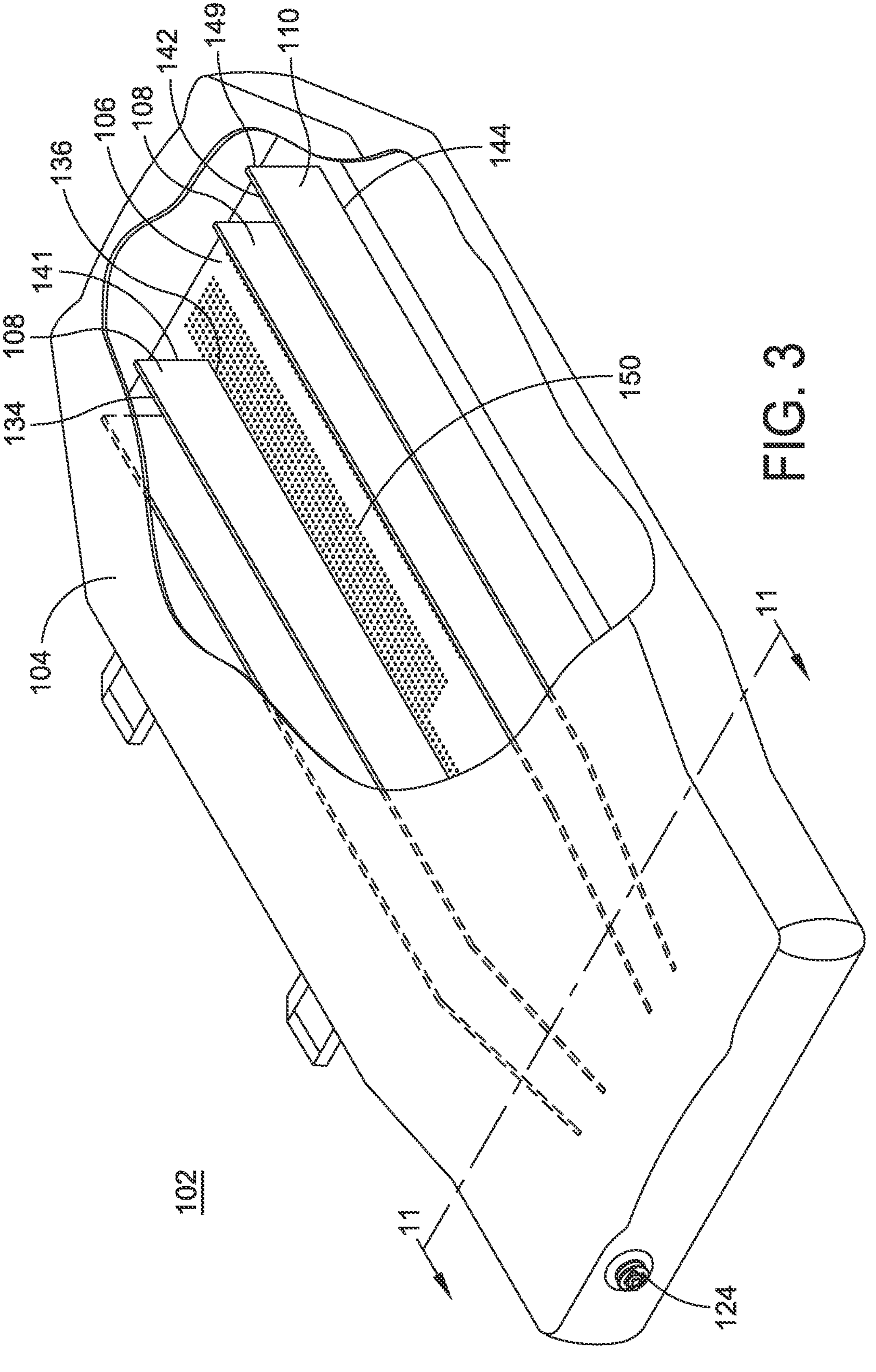
FIG. 3 is a partial cross-sectional perspective view of the inflatable mattress of FIG. 1 in an inflated configuration.

As shown best in FIG. 3, the inner stringers 108 have a superior edge 134 and an inferior edge 136. The superior edge 134 is coupled to the top panel 104 and the inferior edge 136 is coupled to the bottom panel 106. The outer stringers 110 have a superior edge 142 and an inferior edge 144. The superior edge 142 is coupled to the top panel 104 and the inferior edge 144 is coupled to the bottom panel 106.

Figure 7:
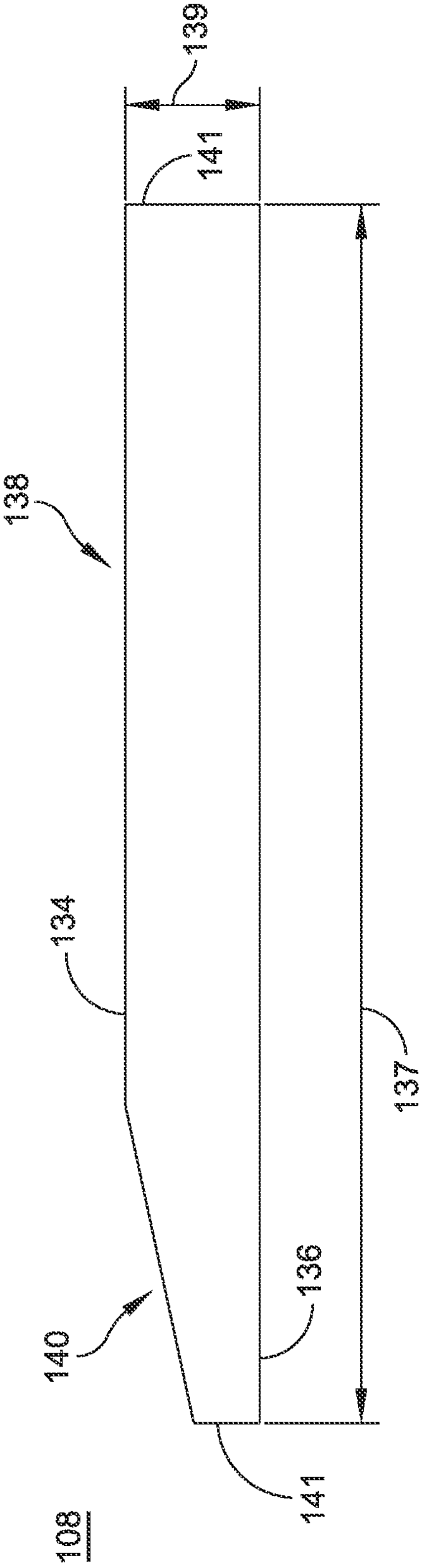
FIG. 7 is a side view of an inner stringer according to the embodiment of FIG. 1.

Turning to FIG. 7, the inner stringers 108 have a first portion 138 which is a substantially constant height 139 and a second portion 140 which has a tapered height, in which the superior edge 134 tapers toward the inferior edge 136. Lateral edges 141 span between the superior edge 134 and the inferior edge 136. The inner stringers 108 have a length 137.

Figure 8:
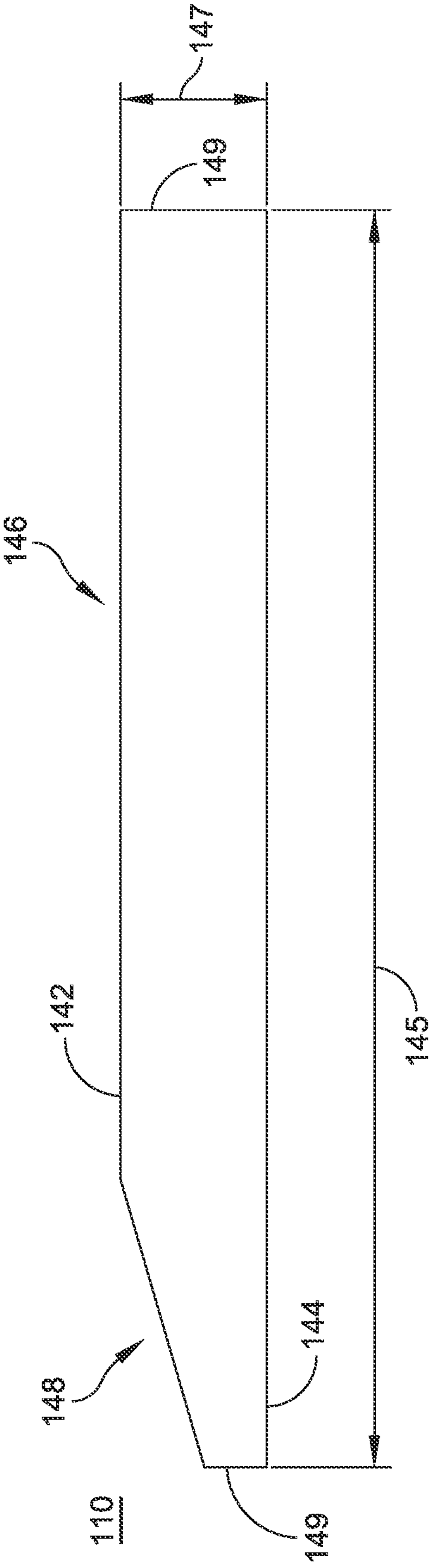
FIG. 8 is a side view of an outer stringer according to the embodiment of FIG. 1.

As shown in FIG. 8, the outer stringers 110 have a first portion 146 which is a substantially constant height 147 and a second portion 148 which has a tapered height, in which the superior edge 142 tapers toward the inferior edge 144. Lateral edges 149 span between the superior edge 142 and the inferior edge 144. The outer stringers 110 have a length 145. In one embodiment, length 137 of inner stringer 108 is less than length 145 of outer stringer 110. In another embodiment, length 137 is equal to length 145. In another embodiment, length 137 is greater than length 145.

In embodiments in which the length of the inner stringers 108 are less than the outer stringer 110, this difference can create a pillow-like region at the proximal end of the transfer mattress 102. This can improve the comfort for the patient.

Figure 4:
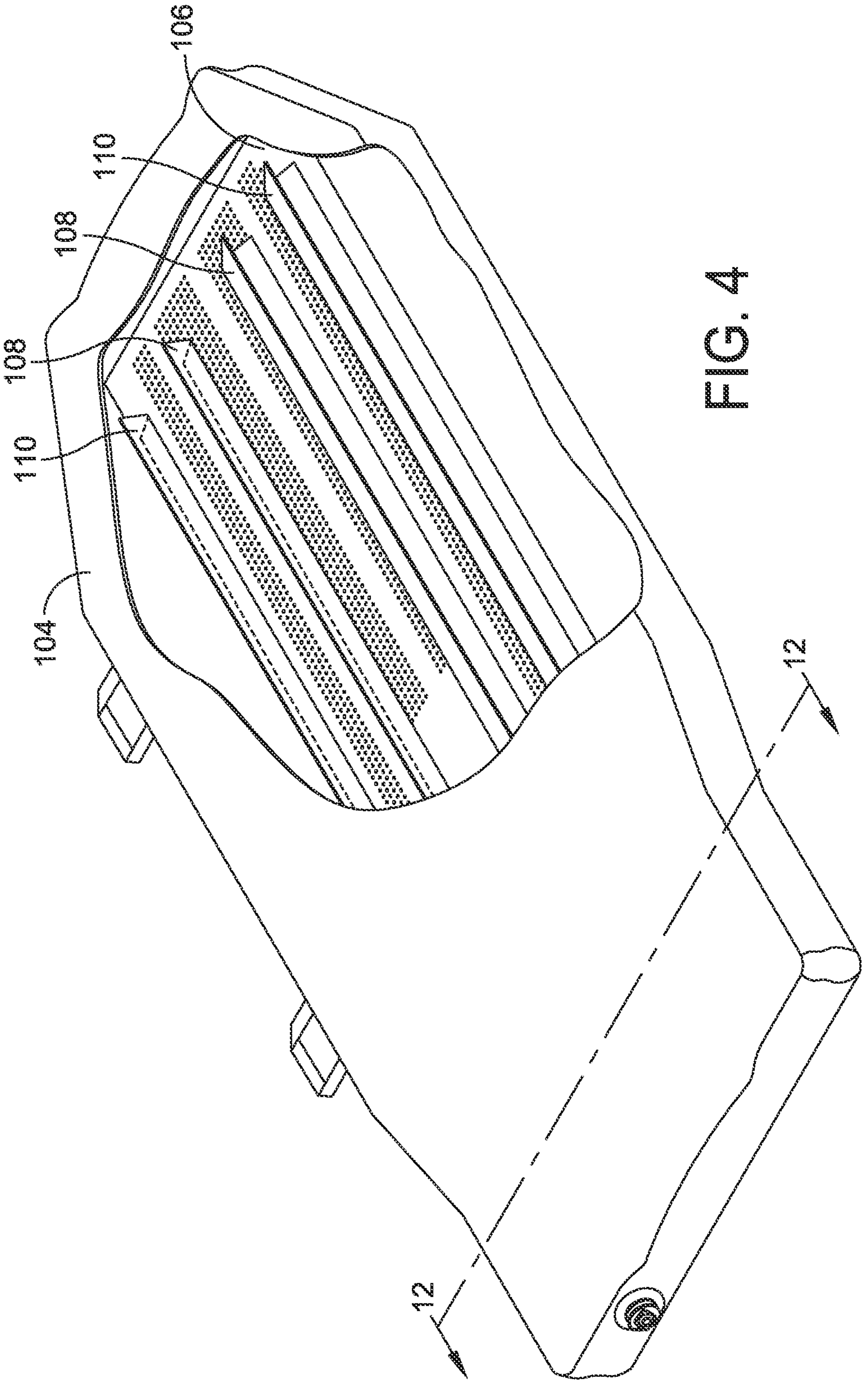
FIG. 4 is a partial cross-sectional perspective view of the inflatable mattress of FIG. 1 in a partially deflated configuration.

Inner stringers 108 and outer stringers 110 are located between the top panel 104 and the bottom panel 106. The inner stringers 108 and outer stringers 110 extend partially between the proximal edges 112, 118 and the distal edges 114, 120. The superior edges 134, 142 of each of the stringers is coupled to the top panel 104 and the inferior edges 136, 144 of each of the stringers is coupled to the bottom panel 106 of the transfer mattress 102. The superior edges 134, 142 and/or the inferior edges 136, 144 can be coupled to the respective top panel 104 or bottom panel 106 by any suitable means, such as, for example, radiofrequency (RF) welding, adhesives, weldable hook fasteners, and/or any other suitable fastening mechanism. In some embodiments, the lateral edges 141, 149 of each of the stringers are not coupled to either the top panel 104 or the bottom panel 106, as shown in FIGS. 3 and 4. The inner stringers 108 and outer stringers 110 can include a plurality of lengths and/or widths. The inner stringers 108 and outer stringers 110 are configured to provide air flow control and/or add structural stability to the transfer mattress 102 in an inflated and/or deflated state. The inner stringers 108 and outer stringers 110 can be constructed of nylon scrim or the like.

As air is pumped into the transfer mattress 102, the top panel 104 separates from the bottom panel 106, drawing the superior edges 134, 142 of each of the stringers away from the bottom panel 106. When the transfer mattress 102 is fully inflated, at least a portion of the stringers can be substantially perpendicular to the plane of each of the top panel 104 and the bottom panel 106. It will be appreciated that the stringers can each have an angle of offset from a vertical axis extending between the top panel 104 and the bottom panel 106 such that the stringers are partially and/or substantially upright but not perpendicular with respect to the top panel 104 and the bottom panel 106, as will be described further herein. The height of the stringers defines a maximum thickness of the transfer mattress 102 when fully inflated.

Figure 5:
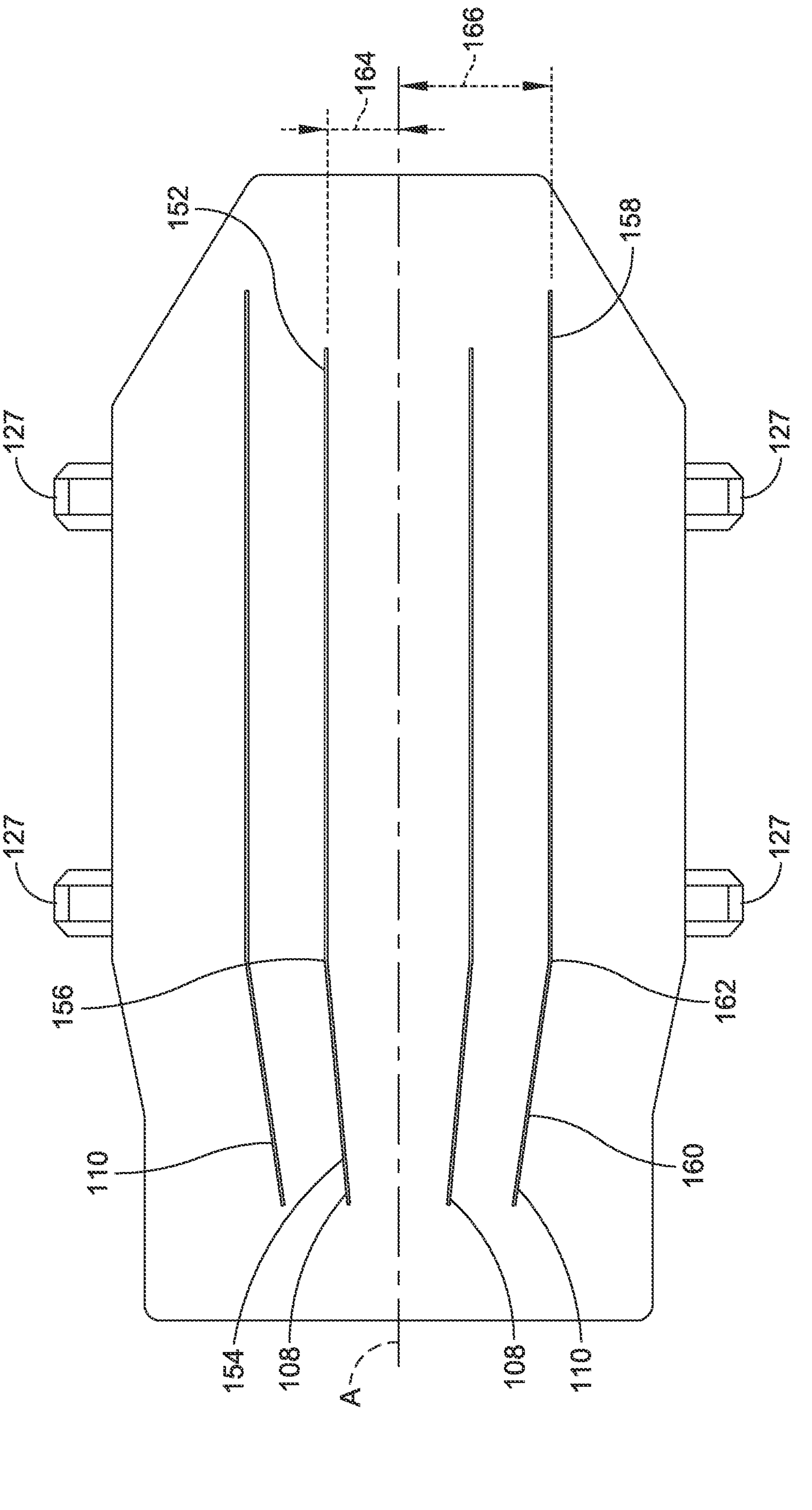
FIG. 5 is a top view of the inflatable mattress of FIG. 1.

The transfer mattress 102 can include any number of inner stringers 108 and outer stringers 110. In some embodiments, the transfer mattress 102 includes one inner stringer 108 and one outer stringer 110 on each side of the central, longitudinal plane of the transfer mattress 102 (the central longitudinal plane includes longitudinal axis A). In other embodiments, more than one inner stringer 108 and outer stringer 110 is disposed on either side of the central, longitudinal plane. In some embodiments, the inner stringers 108 and outer stringers 110 are symmetrically disposed with respect to the central, longitudinal plane, however, it is contemplated that they may be asymmetrically disposed thereabout. As shown in FIG. 5, a longitudinal portion 152 of the inner stringer 108 is mounted a first distance 164 from the longitudinal axis and a longitudinal portion 158 of the outer stringer 110 is mounted a second distance 166 from the longitudinal axis. The ratio of the second distance 166 to the first distance 164 can be any appropriate value. For example, the second distance 166 can be approximately twice as large as the first distance 164. Alternatively, the second distance 166 can be between approximately 1.75 and approximately 2.25 times as large as the first distance 164. Alternatively, the second distance 166 can be between approximately 1.5 and 2.5 times as large as the first distance 164. Alternatively, the second distance 166 can be between approximately 1.25 and 2.0 times as large as the first distance 164.

The stringers direct the airflow within the transfer mattress 102. The plurality of perforations 150 can be arranged around the stringers to advantageously direct the airflow to form an air bearing in areas in which the weight of the patient is transferred to the bottom panel. This makes efficient use of the air introduced by the air supply.

In at least one embodiment, as shown best in FIG. 5, the inner stringers 108 can be attached to the top panel 104 such that they have a substantially longitudinal portion 152, an angled portion 154, and a transition point 156 at the intersection of the longitudinal portion 152 and the angled portion 154. In the angled portion 154, the superior edge 134 defines an acute angle with the longitudinal axis A of the transfer mattress 102. The angle between the superior edge 134 in the angled portion 154 and the longitudinal axis A can be any appropriate angle. In one embodiment, the angle is approximately 5°. In another embodiment, the angle is between approximately 4° and approximately 6°. In another embodiment, the angle is between approximately 2° and approximately 8°.

The outer stringers 110 can be arranged in a similar fashion such that they have a substantially longitudinal portion 158, an angled portion 160, and a transition point 162 at the intersection of the longitudinal portion 158 and the angled portions 160. In the angled portion 160, the superior edge 142 defines an acute angle with the longitudinal axis A of the transfer mattress 102. The angle between the superior edge 142 in the angled portion 160 and the longitudinal axis A can be any appropriate angle. In one embodiment, the angle is approximately 8°. In another embodiment, the angle is between approximately 6° and approximately 10°. In another embodiment, the angle is between approximately 4° and approximately 12°.

In one embodiment, the angle of the angled portion 154 of the inner stringers 108 is different than the angle of the angled portion 160 of the outer stringers 110. In other embodiments, these angles are the same.

In at least one embodiment, the transition points 156, 162 of each of the stringers is aligned at a common location along the length of the transfer mattress 102. In other embodiments, the transition point 156 of the inner stringers 108 is at a different longitudinal position than the transition point 162 of the outer stringers 110. In some embodiments, the transition points 156, 162 coincide with the transition between the first portions 138, 146 and the second portions 140, 148 of the stringers.

Figure 6:
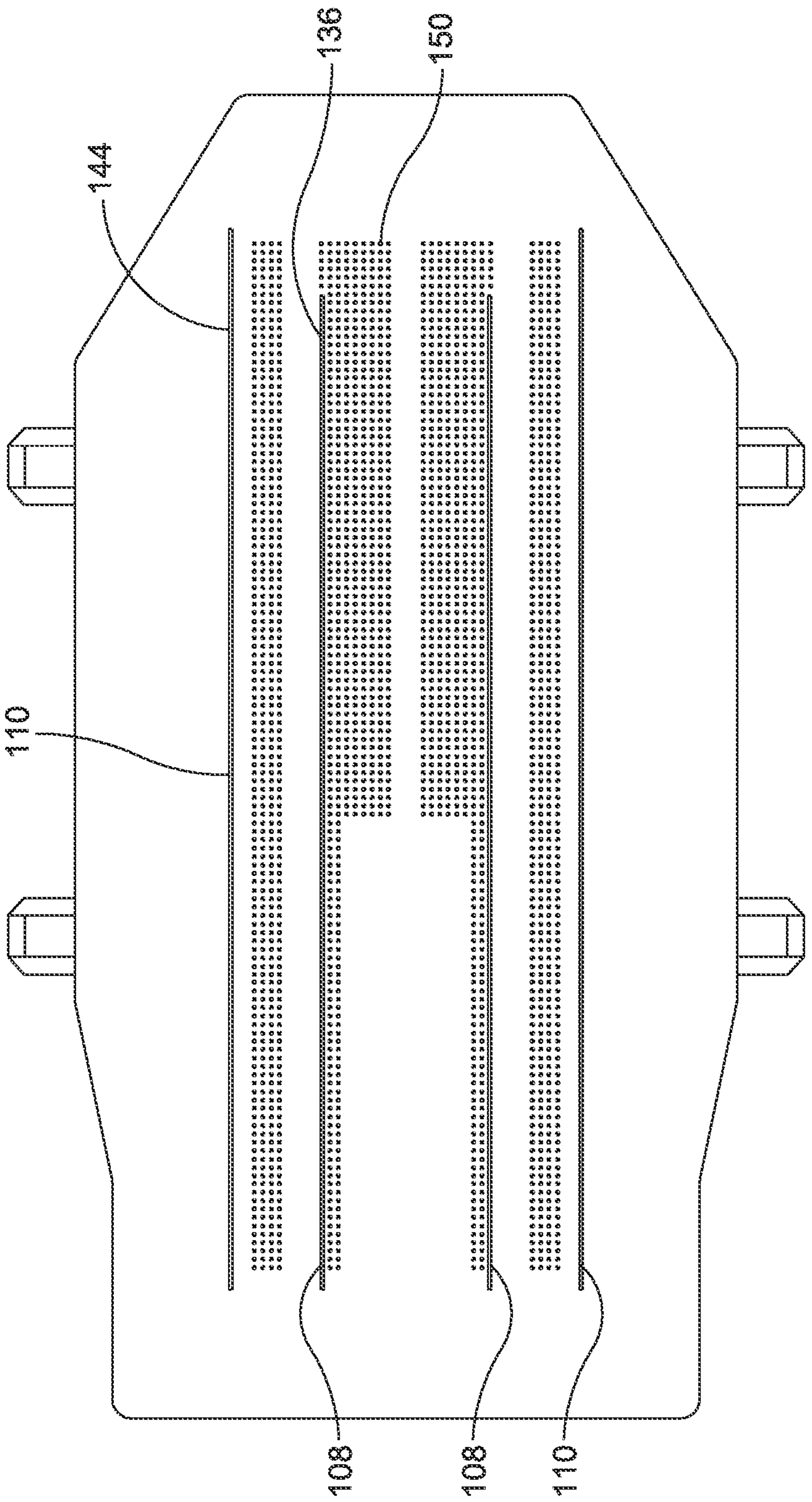
FIG. 6 is a bottom view of the inflatable mattress of FIG. 1.

As seen best in FIG. 6, the inferior edges 136, 144 of the stringers are attached to the bottom panel 106 along a path that is aligned with the longitudinal axis A throughout the length of the stringer. This facilitates the folding of the stringers when the mattress is not inflated (as shown in FIG. 4) to ensure that the mattress is compact during shipment and handling. In one embodiment, when not inflated, the inner stringers 108 and outer stringers 110 fold at approximately the midline of the stringers. When inflated, the stringers unfold as the top panel 104 separates from the bottom panel 106.

When the transfer mattress 102 is deflated, there is significant space between adjacent stringers. As a result, the deflated mattress provides only two layers (the top panel 104 and the bottom panel 106) of material beneath the patient for most of the surface area of the mattress 102. In contrast, when a traditional inflatable mattress is deflated, the transverse stringers are spaced close together or are touching. Such a deflated mattress provides three layers of material beneath the patient (the top panel, the bottom panel, and the stringers) over much of the surface area of the mattress. By reducing the number of layers beneath the patient, the moisture vapor transmission rate of the mattress is significantly increased. This allows air to circulate, maintaining the temperature of the patient and increasing comfort. In addition, the reduction of layers beneath the patient can decrease the prevalence and/or magnitude of pressure points for the patient (interface pressure). This can reduce the prevalence of ulcers and other skin conditions, especially those associated with bed-ridden or relatively immobile patients.

Figure 11:
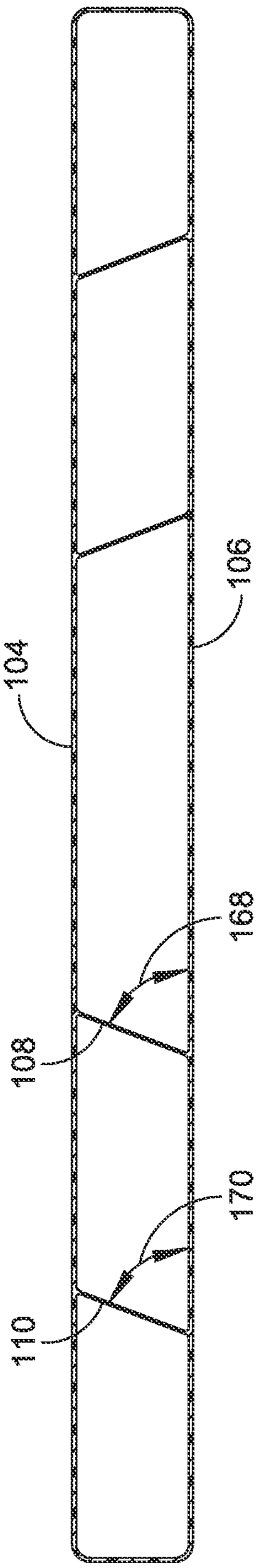
FIG. 11 is a cross-sectional view of the inflatable mattress of FIG. 1 in an inflated configuration, taken along plane 11 shown in FIG. 3.
Figure 12:
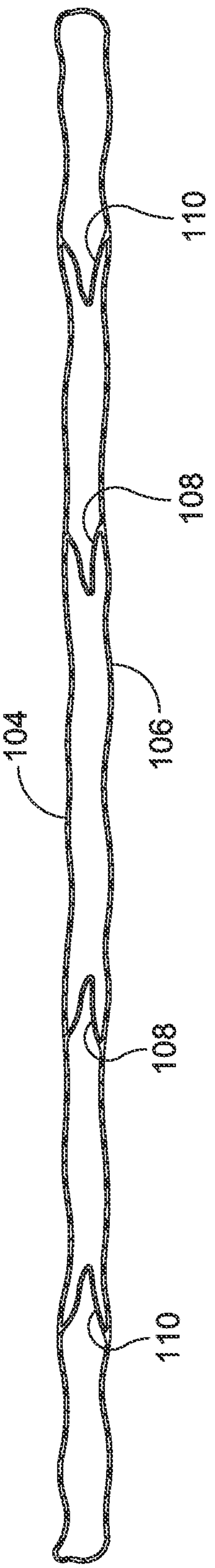
FIG. 12 is a cross-sectional view of the inflatable mattress of FIG. 1 in a partially deflated configuration, taken along plane 12 shown in FIG. 4.

In one embodiment, a portion of the stringer, for example, the second portions 140, 148, can be oriented at a non-perpendicular angle with respect to the top panel and the bottom panel. For example, as shown in the cross-sectional view of FIG. 11, the inner stringers 108 can form an angle 168 with respect to the bottom panel 106. The outer stringers 110 can form an angle 170 with respect to the bottom panel 106. The angles 168, 170 can be the same or can be different. The angled orientation of the inner stringers 108 and outer stringers 110 leads to a reduction in height of the transfer mattress 102 in this area. This reduction in the height of the stringers can act to provide a desired volume of air beneath the patient's buttocks and lower torso. By providing the desired volume of air beneath these portions of the patient, the transfer mattress 102 is better able to support the portions of the patient that accounts for the majority of the patient's weight.

Figure 9:
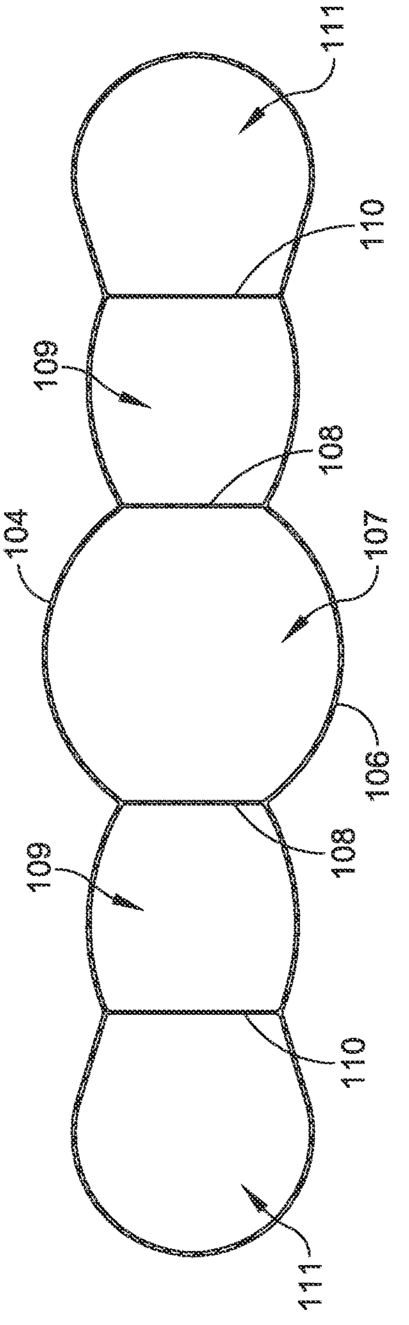
FIG. 9 is a cross-sectional view of one embodiment of an inflatable mattress in an inflated configuration without a patient disposed thereon.
Figure 10:
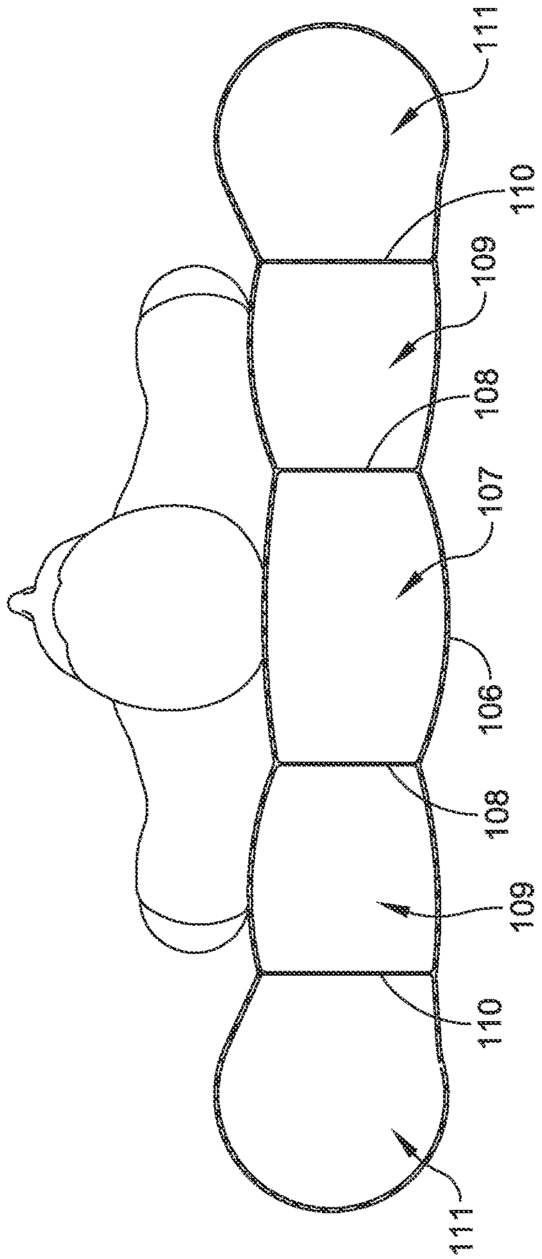
FIG. 10 is a cross-sectional view of the embodiment of FIG. 9 in an inflated configuration with a patient disposed thereon.

As shown in FIGS. 9 and 10, the arrangement of the stringers can form a central chamber 107 between the inner stringers 108; intermediate chambers 109 between the inner stringer 108 and the outer stringer 110 on either side of the inflatable mattress; and an outer chamber 111 in the area between the peripheral edges 116, 122 and the outer stringer 110 on either side of the transfer mattress 102. The central chamber 107, intermediate chambers 109, and outer chambers 111 are in communication such that air can flow between the chambers.

The first distance 164 and second distance 166 can be chosen to create the appropriate level of support to the patient. As shown in FIG. 9, inflating the inflatable mattress without a patient disposed thereon causes each of the central chamber 107, the intermediate chambers 109, and the outer chambers 111 to take on semi-circular cross-sections. The distance between the inner stringers 108 on either side of the central longitudinal axis A may be such that, when the transfer mattress 102 is inflated without a patient thereon, the central chamber 107 has a greater height than the intermediate chambers 109 and outer chambers 111. This may be because the distance between the inner stringers 108 is greater than the distance between adjacent inner stringers 108 and outer stringers 110 and between outer stringers 110 and the perimeter of the transfer mattress 102. When a patient is disposed on the transfer mattress, 102, one or both of the intermediate chamber 109 and outer chamber 111 can have an inflated height that is greater than the height of the central chamber 107. As a result, the transfer mattress 102 creates a cradling effect which provides a patient with a secure feeling and prevents the patient from falling off of the transfer mattress 102.

FIG. 10 shows the same inflatable air mattress 102 in the shape it takes with a patient disposed thereon. As can be seen by comparing FIG. 9 and FIG. 10, with the patient disposed on the transfer mattress 102 a portion of the air within the central chamber 107 is displaced toward the perimeter of the transfer mattress 102. As a result, the central chamber 107 flattens, providing a comfortable surface for the patient. By positioning the inner stringers further apart, a larger volume of air is contained in central chamber 107, thus providing additional support for the patient. In addition, by placing outer stringers 110 closer to the perimeter of the transfer mattress 102, the expansion of the outer chamber 111 is restricted. This ensures that only a limited amount of air is displaced from the central chamber 107 to the outer chamber 111. As a result, the transfer mattress 102 provides sufficient support for the patient. In one embodiment, the distance between the inner stringers 108 is between approximately 25% and approximately 30% of the total width of the transfer mattress 102 when deflated. In another embodiment, the distance between the inner stringers 108 is between approximately 25% and 35% of the total width of the transfer mattress 102 when deflated. In another embodiment, the distance between the inner stringers 108 is between approximately 20% and 35% of the total width of the transfer mattress 102 when deflated. In another embodiment, the distance between the inner stringers 108 is between approximately 25% and 40% of the total width of the transfer mattress 102 when deflated. In another embodiment, the distance between the inner stringers 108 is between approximately 20% and 40% of the total width of the transfer mattress 102 when deflated.

It should be understood that some or all of the top panel 104, the bottom panel 106, the perimeter band 128, the inner stringers 108, and the outer stringers 110 are most often, but not always formed from a sheet of fabric, e.g., nylon scrim or the like, and may be coated on at least the outer surface with an air impermeable coating. One or more surfaces can also be coated with a water proof coating. The water proof coating may be any of the well-known polymeric or elastomeric compounds that are known to be impervious to semi-solids and liquids, such as, blood, urine, feces, hospital strength disinfecting compounds, alcohol, or the like. For example, a nylon twill fabric that is coated on one side with a heat sealable, polyurethane coating (e.g., an inner side) and the outer side coated with a Durable Water Repellant (Patient side). A practical benefit associated with the use of the foregoing preferred materials is that the transfer mattress 102 retains a better appearance for longer periods of time during use. A double coated transfer mattress 102 can be easily wiped down, and can be put back into use more quickly.

Alternatively, in those instances where a single use, single patient mattress is provided, i.e., where patient use lasting less than twenty four hours is desired, some or all of the top panel 104, the bottom panel 106, the perimeter band 128, the inner stringers 108, and the outer stringers 110 may be formed from fibers for forming fabrics suitable for single use. For example, top panel 104 may be made of materials, such as, acetate, acrylic, anidex, aramid, azlon, cotton, elastoester, fluorocarbon, fur, glass, lyocell, melamine, metallic, modacrylic, modal, mosacrylic, novoloid, nylon, nytril, olefin, PAN, PBI, PEEK, Pelco, PEN, PLA, PTT, polyester, polyester-polyarylate, rayon, saran, spandex, sulfar, triacetate, vinal, vinyon, and wool. A common characteristic of the foregoing and like materials is their propensity to stain or discolor as a result of contact with blood, urine, feces, hospital strength disinfecting compounds, alcohol, or the like. Additionally, a variety of films may be used to form a single patient, single use transfer mattress 102, for example, copolyester, copolyether, ethylene vinyl acetate, fluorocarbon, polyamide, olefins, polybutylene, polycarbonate, polyester, polystyrene, polyurethane, polyvinyl, alcohol, polyvinyl chloride, polyvinyl fluoride, and polyvinylidene chloride. A practical benefit associated with the use of the foregoing preferred materials is that such a transfer mattress 102 retains a stained and discolored appearance for longer periods of time after use thereby alerting hospital staff or other care givers that a particular transfer mattress 102 has completed its useful life, and must be discarded.

In one embodiment, some or all of the top panel 104, the bottom panel 106, the perimeter band 128, the inner stringers 108, and the outer stringers 110 may comprise a cold water soluble partially hydrolyzed polyvinyl alcohol, cold water insoluble hot water disintegrable aliphatic polyester, and minor proportions of processing and performance aids. The aliphatic polyester has a melt temperature above the normal body temperature of a human (approximately 37 degrees C. or 98.6 degrees F.) and is present in the resin blend at a concentration sufficient to constitute the continuous phase of the blend, with the polyvinyl alcohol constituting a discontinuous phase of the blend. The aliphatic polyester renders the resin blend, and the partially hydrolyzed polyvinyl alcohol in the blend is, cold water insoluble and determines the temperature at which articles formed from the blend will be subject to dissolution in an aqueous bath and subsequent disposal. A practical benefit associated with the use of the foregoing material is that such a transfer mattress 102 not only retains a stained and discolored appearance for longer periods of time after use, thereby alerting hospital staff or other care givers that a particular transfer mattress 102 has completed its useful life, and must be discarded, but also if an attempt is made to launder the mattress after a single use it disintegrates during the washing process.

In another embodiment, a method for rolling a patient is provided. The arrangement of the longitudinal stringers in the transfer mattresses described herein allow the mattress to be used to easily roll the patient to one side to change the patient's position. In so doing, the mattress reduces the burden on caregivers and at the same time reduces the stress or pain caused to the patient.

To roll the patient, the patient is first positioned on the transfer mattress 102, approximately centered on the top panel. The transfer mattress 102 is inflated with air, thereby raising the patient. A first caregiver presses down on the top panel 104 in the area of the outer chamber 111. By pressing down on the transfer mattress 102, air is displaced out of the outer portion 111, causing the patient to drop toward that side. In addition, the displaced air moves into the chambers on the opposite side of the transfer mattress 102, thereby acting to raise that side of the patient. Simultaneously, or subsequently, a second caregiver lifts upward on the opposite side of the transfer mattress 102. This caregiver can lift by the handles 127 or, alternatively, the second caregiver can lift up by gripping the top or bottom panels 104, 106. As a result of the displacement of the air and the lifting of the mattress, the patient is easily rolled. After rolling the patient, positioning wedges or other positioning instruments can be used to maintain the patient in the desired position.

The arrangement of the stringers described herein facilitates the displacement of air described above by creating substantially longitudinal air chambers. At least a portion of the air within the outer chamber 111 and/or intermediate chamber 109 on the first side of the patient can be easily displaced to the other chambers, thus reducing the height of the outer chamber 111 and allowing the portion of the patient supported by the outer chamber 111 to lower, while at the same time raising the opposite side of the transfer mattress 102. In contrast, the transverse stringers in traditional mattresses create discrete transverse chambers, thereby impeding the displacement of air from the length of the outer portion of one side of the mattress. Instead, the displacement of air in traditional mattress is more localized to the area of applied pressure.

In at least one embodiment, as shown in FIG. 1, the transfer mattress 102 includes one or more connectors 200 for attaching an accessory to the transfer mattress 102. The transfer mattress 102 can include any number of connectors 200. For example, the transfer mattress 102 can include a first connector 200*a* adjacent the proximal edge 112 and a second connector 200*b* adjacent the distal edge 114 and attached along the peripheral edge 116 of the transfer mattress 102. The transfer mattress 102 can also include connectors 200 on the opposite peripheral edge. In addition, the transfer mattress 102 can include one or more connectors 200*c* along the proximal edge 112 and 200*d* along the distal edge 114. The connectors 200 can be coupled to the transfer mattress 102 via, for example, the top panel 104, the bottom panel 106, a perimeter band 128, or a top or bottom seam. The connectors 200 can be outboard of the mattress 102 (i.e., extending from the periphery of the mattress) or, alternatively, within the perimeter of the mattress. The connectors 200 can be any appropriate means for connecting an accessory to the inflatable mattress. For example, the connectors 200 can be snaps, straps, buttons, or hook and loop fastener.

The arrangement of the stringers described herein provides significant advantages when attaching an accessory to the transfer mattress 102. For example, in traditional inflatable mattresses with transverse stringers, as the mattress is inflated the overall length of the mattress is reduced. In contrast, an inflatable mattress with longitudinal stringers, as described herein, does not exhibit this behavior. As a result, the longitudinal distance between two connectors 200 will be maintained as the mattress goes from a deflated to inflated configuration. Because of this, an accessory can be connected to the connectors 200 with the transfer mattress 102 deflated and the accessory will remain taut in the longitudinal direction as the mattress is inflated. This prevents the accessory from bunching and increases patient comfort.

Additionally, the arrangement of the stringers allows a longitudinal connector to be attached to the top panel or the bottom panel prior to sewing or otherwise attaching the stringers and opposite panel. The longitudinal connector can extend along the panel and, in one embodiment, is located at approximately the center line of the panel. Attaching the longitudinal connector prior to sewing the mattress together provides substantial advantages in processing. Specifically, it is easier to accurately place the connector on a single panel prior to assembling the mattress.

In addition, as shown in FIG. 1, a length of hook and loop fastener 202 can be disposed along the top panel 104 adjacent to the superior edge 142 of the outer stringer 110. The proximity of the length of fastener 202 to the stringer 110 provides a direct load path from the accessory through the stringer 110. This may be advantageous when using accessories such as a body litter. By providing a direct load path, when pulling on the body litter, less deformation is introduced to the inflatable mattress than would occur if the accessory was connected to a relatively more flexible portion of the mattress. Hence, the user is more easily able to control movement of the mattress.

In one embodiment, a single length of fastener 202 extends the entire length of the stringer. Alternatively, multiple distinct lengths of fastener 202 can be disposed along a single stringer. Additionally, lengths of fastener 202 can be provided along the superior edge of more than one stringer, as shown in FIG. 1.

In other embodiments, a length of hook and loop fastener is coupled to the bottom panel 106 adjacent an inferior edge of a stringer. In such embodiments, an accessory can be wrapped around the mattress and connected on the bottom side.

Figure 13:
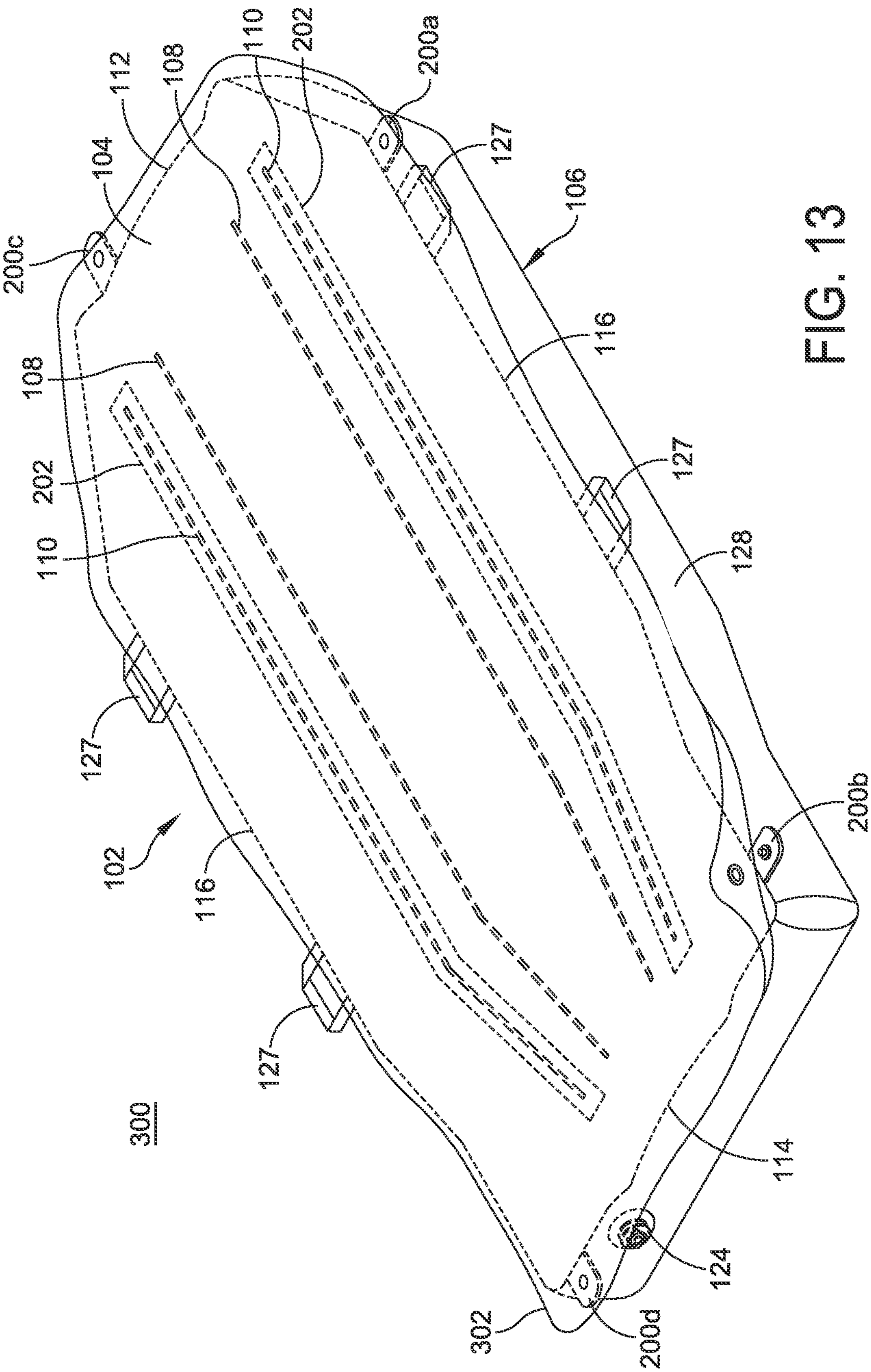
FIG. 13 is a top perspective view of a mattress system, according to one embodiment.

In another embodiment, as shown in FIG. 13, a mattress system 300 is provided. The mattress system 300 includes a transfer mattress 102 according to the embodiments described above and an accessory 302. The accessory 302 can be coupled to the transfer mattress 102 via the connectors 200 or the length of fastener 202.

The accessory can be any appropriate accessory including, but not limited to, a patient turning chamber, a microclimate measurement layer, an interface pressure measurement layer, an infection control identification layer, a disposable absorbent cover, a therapeutic pad, a flexible body litter with carry handles, a non-absorbent sanitary cover, a washable absorbent cover, a disposable cover, at least one cushion, an inflatable mattress with a pressure control valve, and an inflatable mattress with pulsating pressure control. The accessory can also include devices configured to be worn by the patient.

In one embodiment, the accessory 302 is a disposable absorbent layer, as shown. In other embodiments, the accessory is a patient turning chamber, a microclimate measurement layer, an interface pressure measurement layer, an infection control identification layer, a therapeutic pad, a flexible body litter with carry handles, a non-absorbent sanitary cover, a washable absorbent cover, a disposable cover, at least one cushion, an inflatable mattress with a pressure control valve, or an inflatable mattress with pulsating pressure control.

Although the subject matter has been described in terms of exemplary embodiments, it is not limited thereto. Rather, the appended claims should be construed broadly, to include other variants and embodiments, which may be made by those skilled in the art.

What is claimed is:

1. A transfer mattress, comprising:

a top panel having a perimeter including a proximal edge and a distal edge, wherein a central longitudinal axis extends from the proximal edge to the distal edge;

a bottom panel having a plurality of perforations and a perimeter including a proximal edge and a distal edge, the perimeter of the bottom panel coupled to the perimeter of the top panel to define a mattress body;

an outer stringer having a superior edge coupled to the top panel and an inferior edge coupled to the bottom panel such that a portion of the outer stringer extending between the top panel and the bottom panel is at an angle other than 90 degrees with respect to the top panel and the bottom panel when the mattress body is inflated; and an inner stringer positioned between the central longitudinal axis and the outer stringer and having a superior edge coupled to the top panel and an inferior edge coupled to the bottom panel such that a portion of the inner stringer extending between the top panel and the bottom panel is at an angle other than 90 degrees with respect to the top panel and the bottom panel when the mattress body is inflated.

2. The transfer mattress of claim 1, wherein the portion of the outer stringer extending between the top panel and the bottom panel and the portion of the inner stringer extending between the top panel and the bottom panel are angled from the top panel in a direction away from the central longitudinal axis.

3. The transfer mattress of claim 1, further comprising a second inner stringer and a second outer stringer, the second inner stringer and the second outer stringer located on an opposite side of the central longitudinal axis from the inner stringer and the outer stringer.

4. The transfer mattress of claim 3, wherein when the transfer mattress is inflated, a distance between the inner stringer and the second inner stringer is between approximately 25% and approximately 35% of a width of the transfer mattress.

5. The transfer mattress of claim 3, wherein the inner stringer and the second inner stringer are symmetrically located about the central longitudinal axis.

6. The transfer mattress of claim 1, wherein the outer stringer is longer than the inner stringer.

7. The transfer mattress of claim 1, wherein at least a portion of the superior edge of the inner stringer is not parallel with the central longitudinal axis of the transfer mattress.

8. The transfer mattress of claim 1, wherein at least a portion of the inferior edge of the inner stringer is parallel with the central longitudinal axis of the transfer mattress.

9. The transfer mattress of claim 1, wherein the outer stringer and the inner stringer fold toward the central longitudinal axis when the mattress body is deflated.

10. The transfer mattress of claim 1, further comprising:

a first connector coupled to the mattress body; and a second connector spaced from the first connector and coupled to the mattress body;

wherein a longitudinal distance between the first connector and the second connector is the same when the transfer mattress is inflated as when the transfer mattress is deflated, and wherein the first connector and the second connector are configured to couple an accessory to the transfer mattress.

11. The transfer mattress of claim 10, wherein the first connector and the second connector are snaps.

12. The transfer mattress of claim 1, further comprising a length of hook and loop fastener coupled to the top panel and extending along and adjacent to the superior edge of either the outer stringer or the inner stringer.

13. A method of rolling a patient, comprising:

providing a transfer mattress comprising:

a top panel having a perimeter including a proximal edge and a distal edge, wherein a central longitudinal axis extends from the proximal edge to the distal edge;

a bottom panel having a plurality of perforations and a perimeter including a proximal edge and a distal edge, the perimeter of the bottom panel coupled to the perimeter of the top panel; and an inner stringer and an outer stringer on each side of the central longitudinal axis, wherein a portion of each of the inner stringer and the outer stringer are substantially parallel to the central longitudinal axis, wherein a portion of the outer stringer extending between the top panel and the bottom panel is at an angle other than 90 degrees with respect to the top panel and the bottom panel when the transfer mattress is inflated, and a portion of the inner stringer extending between the top panel and the bottom panel is at an angle other than 90 degrees with respect to the top panel and the bottom panel when the transfer mattress is inflated;

positioning a patient on the top panel of the transfer mattress;

inflating the transfer mattress;

applying a downward force on the top panel on a first side of the patient; and applying a lifting force to the transfer mattress on an opposite side of the patient.

14. The method of claim 13, wherein the downward force is applied between the outer stringer and a perimeter edge of the transfer mattress.

15. The method of claim 13, wherein when the transfer mattress is inflated a distance between the inner stringer and the second inner stringer is between approximately 25% and approximately 35% of a width of the transfer mattress.

16. The method of claim 13, wherein at least a portion of the outer stringer is taller than the inner stringer.

17. A mattress system comprising:

a transfer mattress comprising:

a top panel having a perimeter including a proximal edge and a distal edge, wherein a central longitudinal axis extends from the proximal edge to the distal edge;

a bottom panel having a plurality of perforations and a perimeter including a proximal edge and a distal edge, the perimeter of the bottom panel coupled to the perimeter of the top panel to form a mattress body;

an outer stringer having a superior edge coupled to the top panel and an inferior edge coupled to the bottom pane such that a portion of the outer stringer extending between the top panel and the bottom panel is at an angle other than 90 degrees with respect to the top panel and the bottom panel when the mattress body is inflated;

an inner stringer positioned between the central longitudinal axis and the outer stringer and having a superior edge coupled to the top panel and an inferior edge coupled to the bottom panel such that a portion of the inner stringer extending between the top panel and the bottom panel is at an angle other than 90 degrees with respect to the top panel and the bottom panel when the mattress body is inflated;

a first connector coupled to the mattress body;

a second connector spaced from the first connector and coupled to the mattress body, wherein a longitudinal distance between the first connector and the second connector is the same when the transfer mattress is inflated as when the transfer mattress is deflated; and an accessory releasably coupled to the first connector and the second connector.

18. The mattress system of claim 17, wherein the mattress body further comprises a perimeter band and the perimeter of the bottom panel is coupled to the perimeter of the top panel via the perimeter band.

19. The mattress system of claim 17, wherein the accessory is selected from the group consisting of a patient turning chamber, a microclimate measurement layer, an interface pressure measurement layer, an infection control identification layer, a disposable absorbent cover, a therapeutic pad, a flexible body litter with carry handles, a non-absorbent sanitary cover, a washable absorbent cover, a disposable cover, at least one cushion, an inflatable mattress with a pressure control valve, and an inflatable mattress with pulsating pressure control.

20. The mattress system of claim 17, wherein:

a first longitudinal distance is defined between the first connector and the proximal edge of the top panel and a second longitudinal distance is defined between the first connector and the distal edge of the top panel, the first longitudinal distance after inflation of the transfer mattress is the same as the first longitudinal distance before inflation of the transfer mattress, and the second longitudinal distance after inflation of the transfer mattress is the same as the second longitudinal distance before inflation of the transfer mattress.

* * * * *